(12) United States Patent
Chuang (10) Patent No.: US 9,154,986 B2
(45) Date of Patent: Oct. 6, 2015

(54) METHOD OF MINIMIZATION OF DRIVE TESTS MEASUREMENT CONFIGURATION TRIGGERING

(71) Applicant: ACER INCORPORATED, New Taipei (TW)

(72) Inventor: Ming-Dao Chuang, New Taipei (TW)

(73) Assignee: ACER INCORPORATED, Xizhi Dist., New Taipei (TW)

(*) Notice: Subject to any disclaimer, the term of this patent is extended or adjusted under 35 U.S.C. 154(b) by 0 days.

(21) Appl. No.: 13/794,837

(22) Filed: Mar. 12, 2013

(65) Prior Publication Data

US 2013/0279342 A1 Oct. 24, 2013

Related U.S. Application Data

(60) Provisional application No. 61/635,870, filed on Apr. 20, 2012.

(51) Int. Cl.
*H04L 1/00* (2006.01)
*H04W 24/10* (2009.01)

(52) U.S. Cl.
CPC .................................. *H04W 24/10* (2013.01)

(58) Field of Classification Search
None
See application file for complete search history.

(56) References Cited

U.S. PATENT DOCUMENTS

| 2011/0250880 A1 | 10/2011 | Olsson |
| 2012/0087258 A1 | 4/2012 | Lee |
| 2012/0252471 A1* | 10/2012 | Futaki ........................ 455/450 |
| 2013/0324106 A1* | 12/2013 | Bodog ........................ 455/422.1 |

FOREIGN PATENT DOCUMENTS

| CN | 102421118 A | 4/2012 |
| CN | 103563421 A | 2/2014 |
| TW | 201210393 | 3/2012 |
| TW | 201212665 | 3/2012 |
| WO | 2012039722 A1 | 3/2012 |
| WO | 2012049957 A1 | 4/2012 |

* cited by examiner

*Primary Examiner* — Kevin C Harper
(74) *Attorney, Agent, or Firm* — Winston Hsu; Scott Margo (57) ABSTRACT

A method of MDT measurement configuration triggering for a mobile device in a wireless communication system is disclosed. The method comprises determining whether an event predefined in the mobile device occurs, and transmitting a message for indicating a network of the wireless communication system to configure a MDT measurement to the mobile device, to the network when the event occurs.

4 Claims, 7 Drawing Sheets

METHOD OF MINIMIZATION OF DRIVE TESTS MEASUREMENT CONFIGURATION TRIGGERING

CROSS REFERENCE TO RELATED APPLICATIONS

This application claims the benefit of U.S. Provisional Application No. 61/635,870, filed on Apr. 20, 2012 and entitled "User triggers Network to start MDT configuration", the contents of which are incorporated herein in their entirety.

BACKGROUND OF THE INVENTION

1. Field of the Invention

The application relates to a method utilized in a wireless communication system, and more particularly, to a method of MDT measurement configuration triggering in a wireless communication system.

2. Description of the Prior Art

Coverage is something that a customer can easily notice through the terminal user interface (UI) (i.e. out-of-service area indication), and is a major criteria that a customer considers when comparing service provided by different operators. With the increase in data service provision, downlink throughput is also an important criterion by which many customers judge the performance of the network. Poor uplink coverage will impact user experience in terms of call setup failure/call drop/poor uplink voice quality.

Accordingly, it is very important for operators to be aware of the coverage/throughput their networks provide, and rigorous "drive tests" are performed to collect such information. However, what has to be taken account of is that the drive tests for network optimization purposes is costly and causes also additional CO2 emissions, so it is desirable to develop automated solutions, including involving UEs in the field, in 3GPP to reduce the operator costs for network deployment and operation. Therefore, minimization of drive tests (MDT) functionality involving measurement is performed or logged by UE to collect information in idle mode or connected mode, to reduce network maintenance costs for operators, ensure faster optimization cycle resulting in higher customer satisfaction and nonetheless help to reduce the carbon emission to protect the environment.

Note that, when a UE with MDT functionality receives a MDT measurement configuration message from a network (e.g. Universal Terrestrial Radio Access Network (UTRAN) in Universal Mobile Telecommunications System (UMTS), Evolved Universal Terrestrial Radio Access Network (E-UTRAN) in Long-Term Evolution (LTE), EPC, RNC or core network), the UE shall perform measurement logging for the purpose of MDT.

According to the specification of 3GPP TS 37.320, section 5.1.3, MDT procedure starts at the network side that chooses a public land mobile network (PLMN) with specific UE, a limited region within a PLMN (i.e. limited by a cell list, a TA list, a LA list or a RA list) without specific UE, a PLMN with specific UE, or a limited region within a PLMN with specific UE. However, the applicant notices that if network assign a PLMN without specific UE to do MDT measurement, it wastes wireless network resource and UE battery. In addition, if network assigns a region within a PLMN with/without specific UE, the network will not know issues outside the specific region.

SUMMARY OF THE INVENTION

The application discloses a method of MDT measurement configuration triggering in a wireless communication system, in order to solve the abovementioned problems.

A method of MDT measurement configuration triggering for a mobile device in a wireless communication system is disclosed. The method comprises determining whether an event predefined in the mobile device occurs, and transmitting a message for indicating a network of the wireless communication system to configure a MDT measurement to the mobile device, to the network when the event occurs.

A method of MDT measurement configuration triggering for a network in a wireless communication system is disclosed. The method comprises receiving a message for indicating the network to configure a MDT measurement, from a mobile device of the wireless communication system, and configuring the MDT measurement to the mobile device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
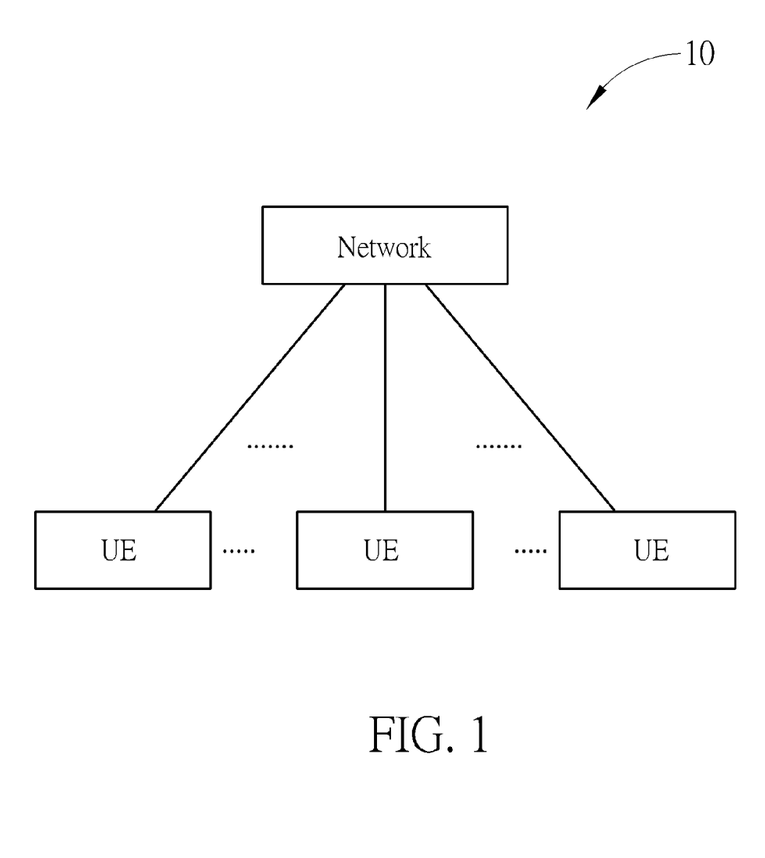
FIG. 1 illustrates a schematic diagram of an exemplary wireless communication system.

Please refer to FIG. 1, which illustrates a schematic diagram of a wireless communication system 10 according to an example. Briefly, the wireless communication system 10 is composed of a network and a plurality of user equipments (UEs). The wireless communication system 10 can be a UMTS (Universal Mobile Telecommunications System), an LTE (long-term evolution) system or any other similar network system. In the UMTS system, the network can be referred as a UTRAN (Universal Terrestrial Radio Access Network) comprising a plurality of base stations (NodeBs), whereas the mobile devices are referred as to user equipments (UEs). The UEs can be devices such as mobile phones, computer systems, etc. This terminology will be used throughout the application for ease of reference. However, this should not be construed as limiting the disclosure to any one particular type of network. In some examples, the network and the UE maybe seen as a transmitter or receiver according to transmission direction, e.g., for uplink (UL), the UE is the transmitter and the network is the receiver, and for downlink (DL), the network is the transmitter and the UE is the receiver.

Figure 2:
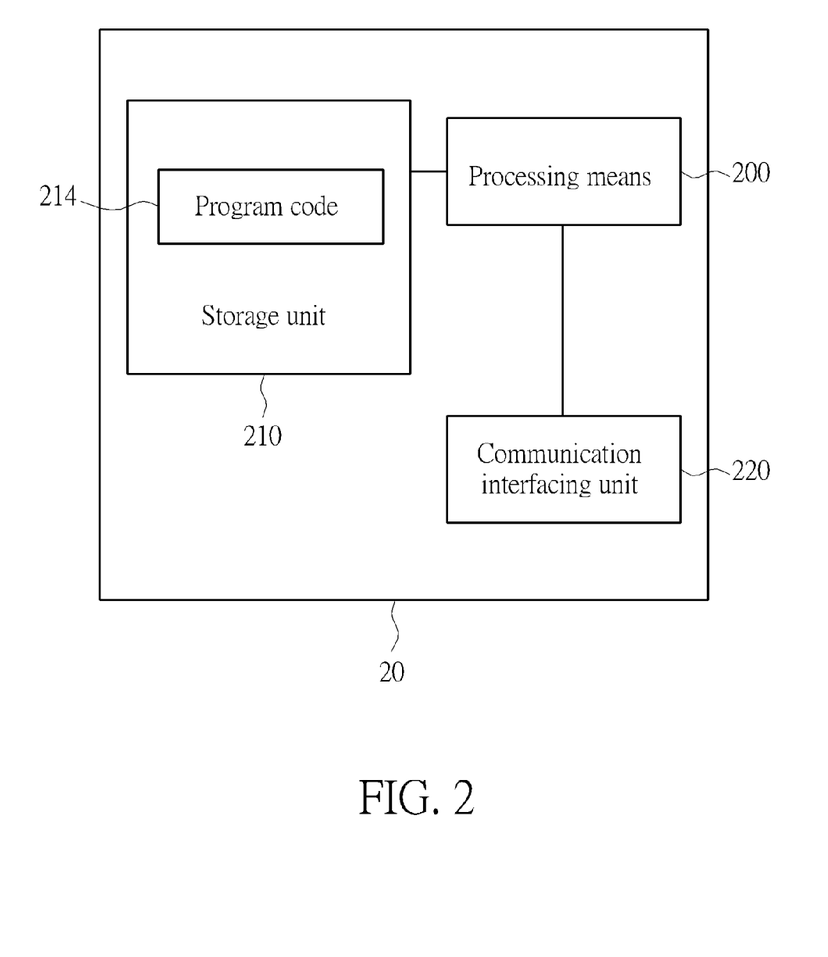
FIG. 2 illustrates a schematic diagram of an exemplary communication device.

FIG. 2 illustrates a schematic diagram of an exemplary communication device 20. The communication device 20 can be the UE or the network shown in FIG. 1. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
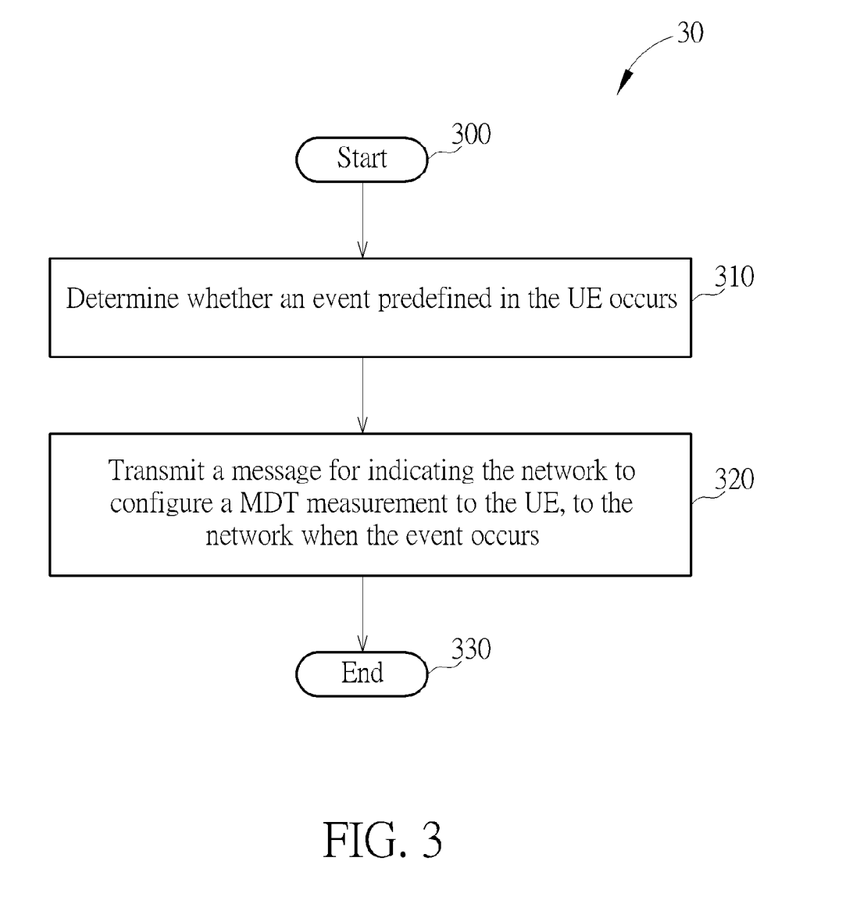
FIG. 3 is a flowchart of an exemplary process according to the present disclosure.

Please refer to FIG. 3, which illustrates a flowchart of an exemplary process 30. The process 30 is utilized in a UE as shown in FIG. 1, for triggering MDT measurement configuration. The process 30 can be compiled into the program code 214 and includes the following steps:

Step 300: Start.

Step 310: Determine whether an event predefined in the UE occurs.

Step 320: Transmit a message for indicating the network to configure a MDT measurement to the UE, to the network when the event occurs.

Step 330: End.

According to the process 30, the UE actively sends the message to trigger the network to start MDT procedure when the predefined event occurs. In a word, the MDT procedure can be triggered by the UE side. It saves wireless network resource and UE battery since the network does not need to assign UEs in a PLMN to do MDT measurement. In addition, if the UE is not at MDT measurement configuration area and there is an issue happened that network may not know (voice quality bad or data throughput bad, etc), the UE can sends the message to the network for MDT measurement configuration, and thereby the network knows the issue not limited to the specific region within a PLMN.

Note that, the UE may determine the event occurs when a user of the UE press a button of the UE, wherein the button includes an application or a dialer of the UE. Please refer to FIG. 4, which is a schematic diagram of press choice on a UE. As can be seen, the user may have only one choice to press this button, or several choices to press buttons according to the issue type. For example, the user may be aware of an issue, such as the voice quality is bad or the data throughput is bad, and thereby presses the buttons accordingly. Thus, the UE can distinguish different issues (i.e. voice quality bad, data throughput bad, etc) with user pressed buttons.

Figure 4:
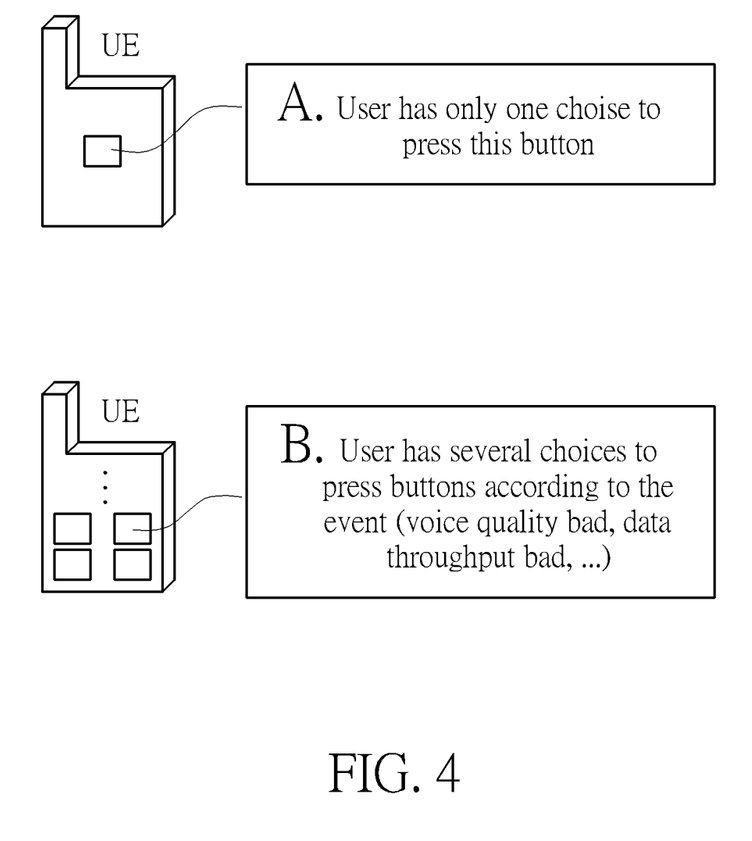
FIG. 4 illustrates a schematic diagram of press choice on user equipment.

On the other hand, if there is only one choice of button for the user to press, the UE autonomously detects the issue that the user met. For example, the UE may detect the issue that the user met according to a voice quality, voice rate, channel quality, data throughput, signal strength and/or signal quality. In detail, if a value corresponding to the voice quality, voice rate, channel quality, data throughput, signal strength or signal quality is lower than a predetermined value in the UE, the UE knows the issue that the user met. For example, according to specification of 3GPP TS 26.091 and 3GPP TS 26.093, the UE may determine that the issue is voice quality bad if a decoded voice rate <12.2 kbps. According to specification of 3GPP TS 25.214, the UE determines that the issue is data throughput bad if a channel quality indication is lower than a specific value (ex: <20). According to specification of 3GPP TS 36.214, the UE may determine that the issue is LTE signal strength bad if RSRP lower than a specific value (ex: <−95 dBm), or signal quality bad if RSRQ lower than specific value (ex: <−14 dB). As to 3G signal, the UE may determine signal strength bad if CPICH RSCP lower than specific value (ex: <−95 dBm), or signal quality bad if CPICH Ec/No lower than specific value (ex: <−14 dB) (please refer to 3GPP TS 25.133). As to 2G signal, the UE determines signal strength bad if RXLEV lower than specific value (ex: <−90 dBm), or signal quality bad if RXQUAL lower than specific value (ex: BER>1%) (please refer to 3GPP TS 45.008).

Alternatively, the UE autonomously determines the event occurs without user pressing the button. For example, the UE determines the event occurs when a parameter corresponding to the voice quality, voice rate, channel quality, data throughput, signal strength or signal quality is lower than a predetermined value. The detailed description associated to the event determination can be referred from above, so it is omitted herein.

In addition, the message for indicating the network to configure the MDT measurement to the UE may include a cause value associated to the occurred event/issue (i.e. voice quality bad, data throughput bad, etc). Thus, the network can accurately configure the MDT measurement to the UE with the cause value in the message . However, if the message includes no cause value, after the network receives the message, the network auto detects the issue that the user met, and thereby configures the MDT measurement to the UE accordingly.

Figure 5:
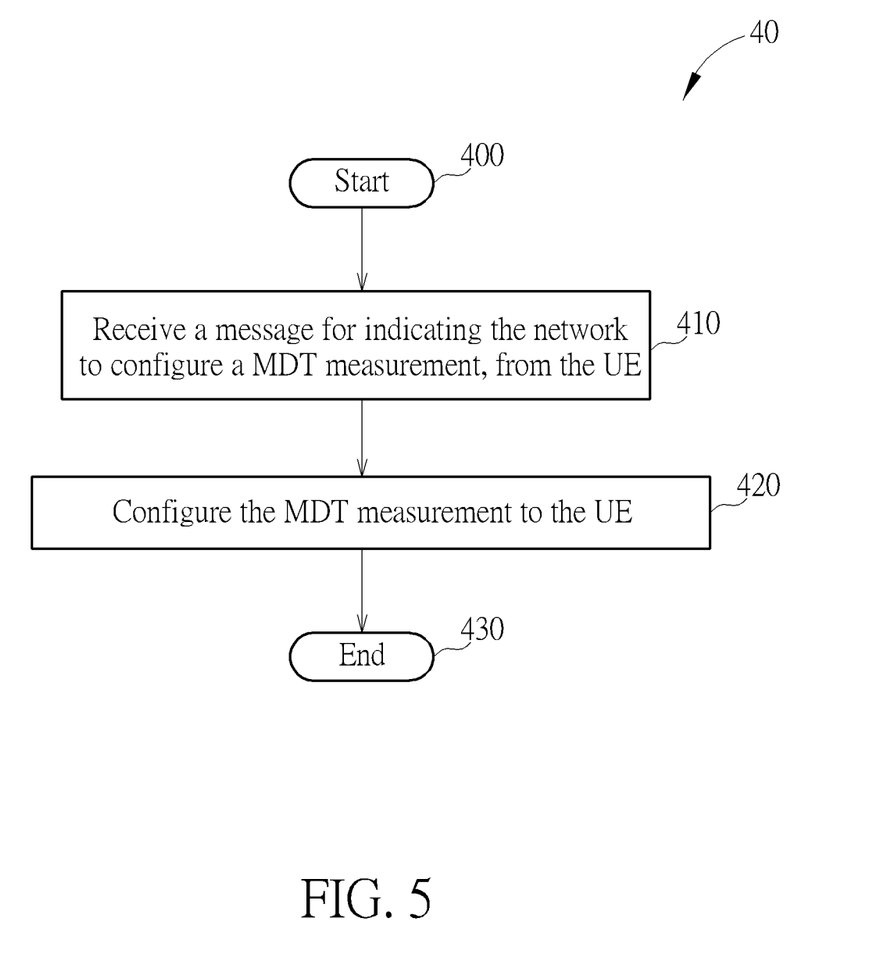
FIG. 5 is a flowchart of an exemplary process according to the present disclosure.

Please refer to FIG. 5, which illustrates a flowchart of an exemplary process 50. The process 50 is utilized in the network as shown in FIG. 1, for triggering MDT measurement configuration. The process 50 can be compiled into the program code 214 and includes the following steps:

Step 500: Start.

Step 510: Receive a message for indicating the network to configure a MDT measurement, from the UE.

Step 520: Configure the MDT measurement to the UE.

Step 530: End.

According to the process 50, when the network receives the message for MDT procedure start from the UE, the network configures the MDT measurement only on the UE. It saves wireless network resource and UE battery. In addition, the network also knows the issue not limited to the specific region within a PLMN. The detailed description can be referred from above, so it is not given herein.

Figure 6:
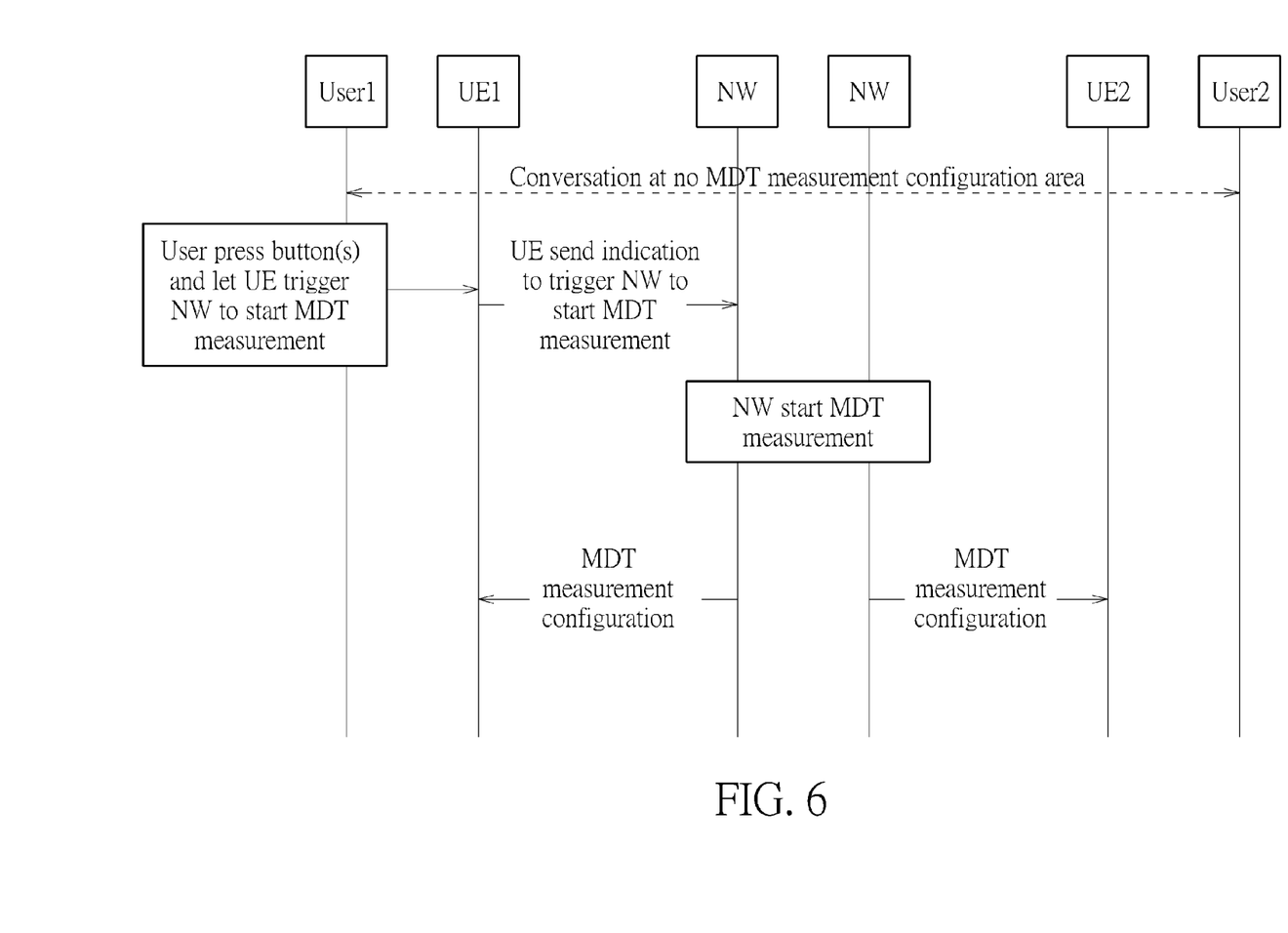
FIG. 6 illustrates a schematic diagram of voice quality bad triggering network to start MDT measurement of user equipment.

Take an example based on the processes 30, 50. Please refer to FIG. 6, which is a schematic diagram of voice quality bad triggering network to start MDT measurement of a UE. In FIG. 6, the user 1 of the UE1 and user 2 of the UE2 have a conversation at no MDT measurement configuration area. If the user 1 is aware of voice quality bad, the user 1 presses button(s) of the UE1, and thereby the UE1 sends the message to trigger the network NW to start the MDT measurement of the UE1 and UE2. After the network NW receives the message, the network sends MDT measurement configurations to the UE1 and UE2. Note that, as abovementioned, if the message includes the cause value associated to the event or issue, the network NW shall configures the MDT measurement to the UE1 and UE2 according to the cause value in the message. On the other hand, if no cause value is included in the message, the network NW shall auto detect the issue that the user met, and thereby configures the MDT measurement to the UE1 and UE2 accordingly.

Figure 7:
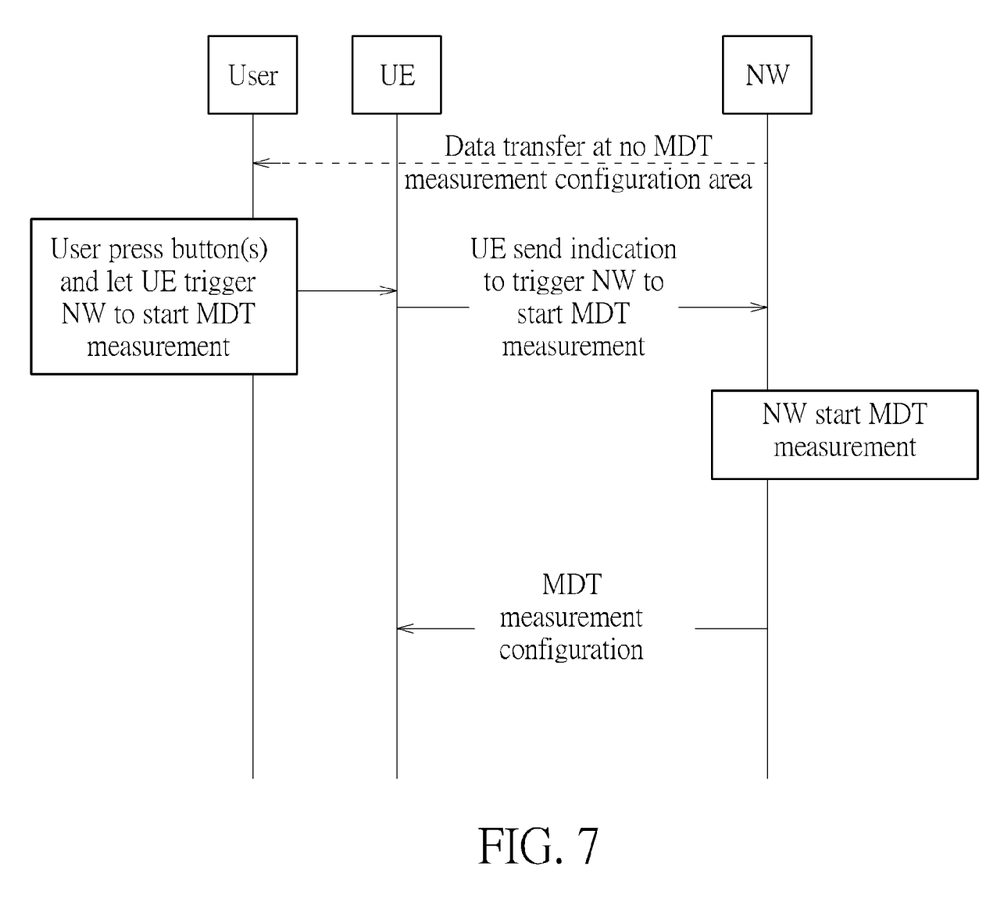
FIG. 7 illustrates a schematic diagram of data throughput bad triggering network to start MDT measurement of user equipment.

In addition, please refer to FIG. 7, which is a schematic diagram of data throughput bad triggering network to start MDT measurement configuration. In FIG. 7, the UE performs data transfer at no MDT measurement configuration area. If the user of the UE is aware of data throughput bad, the user presses button(s) of the UE, and thereby the UE sends the message to trigger the network NW to start the MDT measurement of the UE. After the network NW receives the message, the network NW sends MDT measurement configuration to the UE.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, the present invention provides methods for the UE to actively trigger the MDT measurement configuration from the network, so as to avoid waste of the wireless network resource and UE battery. In addition, with UE triggering the MDT procedure, the network knows issues outside the specific region of a PLMN.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of MDT measurement configuration triggering for a mobile device in a wireless communication system, the method comprising:
   determining whether an event predefined in the mobile device occurs; and
   transmitting a message for indicating to a network of the wireless communication system to configure a MDT measurement to the mobile device, to the network when the event occurs;
   wherein determining whether the event predefined in the mobile device occurs comprises:
   determining whether the event predefined in the mobile device occurs according to a voice quality, voice rate, channel quality, data throughput, signal strength and/or signal quality;
   wherein transmitting the message for indicating to the network of the wireless communication system to configure the MDT measurement to the mobile device, to the network when the event occurs comprises:
   including an cause value associated to the event in the message; and
   transmitting the message including the cause value to the network, whereby the network configures the MDT measurement according to the cause value.

2. The method of claim 1, wherein determining whether the event predefined in the mobile device occurs comprises:
   determining the event predefined in the mobile device occurs when a user of the mobile device press a button of the mobile device, wherein the button includes an application or a dialer of the mobile device.

3. The method of claim 1, wherein determining whether the event predefined in the mobile device occurs according to the voice quality, voice rate, channel quality, data throughput, signal strength and/or signal quality comprises:
   determining the event predefined in the mobile device occurs when a parameter corresponding to the voice quality, voice rate, channel quality, data throughput, signal strength or signal quality is lower than a predetermined value.

4. A method of MDT measurement configuration triggering for a network in a wireless communication system, the method comprising:
   receiving a message for indicating the network to configure a MDT measurement, from a mobile device of the wireless communication system; and
   configuring the MDT measurement to the mobile device, wherein the configuring step comprises:
   configuring the MDT measurement to the mobile device according to a cause value included in the message received from the mobile device, wherein the cause value is associated to the voice quality, voice rate, channel quality, data throughput, signal strength and/or signal quality associated to the mobile device.

* * * * *